(12) United States Patent
Inaba

(10) Patent No.: US 7,656,344 B2
(45) Date of Patent: Feb. 2, 2010

(54) TARGET DETECTING METHOD AND TARGET DETECTING APPARATUS

(75) Inventor: Takayuki Inaba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 11/920,857

(22) PCT Filed: Aug. 19, 2005

(86) PCT No.: PCT/JP2005/015120

§ 371 (c)(1),
(2), (4) Date: Nov. 21, 2007

(87) PCT Pub. No.: WO2007/020704

PCT Pub. Date: Feb. 22, 2007

(65) Prior Publication Data

US 2009/0207068 A1   Aug. 20, 2009

(51) Int. Cl.
*G01S 13/93*   (2006.01)
(52) U.S. Cl. ....................................... 342/70
(58) Field of Classification Search .................. 342/70, 342/110, 160, 159; 367/105
See application file for complete search history.

(56) References Cited

U.S. PATENT DOCUMENTS

| 4,233,604 A | * | 11/1980 | Lepere | 342/159 |
| 5,781,149 A | * | 7/1998 | Long | 342/160 |
| 6,292,129 B1 | * | 9/2001 | Matsugatani et al. | 342/70 |
| 2004/0183719 A1 | * | 9/2004 | Natsume et al. | 342/147 |
| 2009/0207068 A1 | * | 8/2009 | Inaba | 342/70 |

FOREIGN PATENT DOCUMENTS

| JP | 7-43449 A | 2/1995 |
| JP | 7-72237 A | 3/1995 |
| JP | 8-240659 A | 9/1996 |
| JP | 3525426 B2 | 2/2004 |
| JP | 2004-245602 A | 9/2004 |
| JP | 3622565 B2 | 12/2004 |

* cited by examiner

*Primary Examiner*—Dan Pihulic
(74) *Attorney, Agent, or Firm*—Birch, Stewart, Kolasch & Birch, LLP

(57) ABSTRACT

A receiving part receives, over a plurality of pulse reception sections, the echo of a transmitted pulse in a first range cell after a lapse of a first time period from a pulse transmission, and outputs a first signal based on the received echo. The receiving part also receives, over a plurality of pulse reception sections, the echo of the transmitted pulse in a second range cell after a lapse of a second time period from the pulse transmission, and outputs a second signal based on the received echo. A signal integrating part integrates a first number of first signals and outputs an integration result as a first range integration signal. The signal integrating part also integrates a second number of second signals and outputs an integration result as a second range integration signal. A target detecting part detects, based on the first and second range integration signals, a target.

4 Claims, 8 Drawing Sheets

US 7,656,344 B2

TARGET DETECTING METHOD AND TARGET DETECTING APPARATUS

TECHNICAL FIELD

The present invention relates to a pulse radar and a method of detecting movement characteristics (position or relative distance, relative velocity, and the like) of a distant target by using a pulsed radar wave, in particular, a technique of detecting movement characteristics of a target present in a wide distance range from short to long distances with a low-cost apparatus configuration.

BACKGROUND ART

The main fields of application of a conventional radar technique are defense and meteorology. The production of radar apparatuses in a small quantity is sufficient for those fields, and the achievement of requested performance is demanded even at the expense of cost. For an on-vehicle radar, which is a new field of application of the radar technique, however, the scale of mass production can be from tens of thousands to hundreds of thousands in number depending on the degree of market saturation, even millions in some cases. For the diffusion of the on-vehicle radars, production cost thereof is required to be reduced.

In order to supply a low-cost radar apparatus satisfying such requirements, besides a low-load signal processing method which replaces a signal processing method requiring a high-performance processing circuit as employed in the conventional radar technique, an antenna configuration is required to be simplified and to lower transmission power.

On the other hand, the on-vehicle radar has an object of detecting an obstacle in driving to avoid danger, thereby enhancing the driving safety. In some cases, a crucial process involving a human life has to be executed with good accuracy. Therefore, although it is true that the cost is required to be reduced, the performance of detecting a target is not allowed to be sacrificed. More specifically, a target present in a relatively wide angle range, in the range of 0 m to about 200 m in terms of the relative distance, is required to be detected within several milliseconds with a resolution of about 1 m.

Conventionally known radar systems include a pulse system, a pulse compression system (spread spectrum radar), an FMCW system, and a dual-frequency CW system. In the pulse system or pulse compression system radar apparatus, for example, in order to obtain a resolution of 1 m, a broadband over 150 MHz is required. In the case of the pulse compression radar, in particular, a computation load for correlation processing is large, requiring signal processing at a high speed. As a result, those systems are disadvantageous in terms of production cost reduction.

On the other hand, in the systems such as the frequency modulated continuous wave (FMCW) system, the dual-frequency CW system, and a multi-frequency CW system, it is known that a desired range resolution is obtained through signal processing at relatively low speed. Therefore, because those systems have an advantage in that the demands for reduction in production cost and increase in resolution can be satisfied at the same time, they are expected to be used for the on-vehicle radar.

In reality, however, those systems using a continuous wave (CW) as a transmitted wave (hereinafter, the radar systems using a continuous wave are collectively referred to as "CW system") has significant tasks such as ensuring isolation between transmission and reception and taking countermeasures against unnecessary reflected wave with a small propagation loss from a short range (nearby clutter). Therefore, in order to cope with such problems, systems including a frequency modulated interrupted continuous wave (FMICW) system in which a continuous transmitted wave is pulsed are known.

Further, the on-vehicle radar is required to detect a target present in a wide angle range, such as vehicles running ahead in a plurality of lanes. In order to satisfy the requirement, an antenna system for mechanically driving an aperture antenna, a multi-beam antenna system, a phased-array system including an array antenna, a digital beam forming (DBF) system, and the like are known.

Among the above systems, the mechanical driving systems require a long observation time for observing a reflection source in a wide coverage. Therefore, it is difficult to enhance response performance. The multi-beam antenna system for simultaneously emitting transmitted beams in multiple directions and the phased-array system including an array antenna which uses electrical phase control to change a beam scanning direction within a short period of time have no problem in response performance. However, those systems are not suitable for mass production because the mechanism of the antenna is too complicated.

On the other hand, the DBF system realizes beam formation by digital signal processing and is advantageous in excellent process adaptability, scalability, and high-resolution. In particular, the on-vehicle radar is requested to detect an object present in a wide coverage within a short period of time (ideally, within several milliseconds). Therefore, the combination of a beam having a large beam width referred to as wide-angle beam or fan beam and the DBF system is advantageous as a system for the on-vehicle radar.

The wide-angle beam has such a wide beam width that a single pulse illuminates the entire requested coverage. With the combination of the wide-angle beam and the DBF method, after a beam having such a wide beam width that the requested coverage can be covered at one time is transmitted, an echo of the transmitted beam is captured by an array antenna. Thereafter, according to the DBF method, an output signal from each of element antennas of the array antenna which has captured the beam is subjected to digital signal processing to form a beam in an arbitrary direction (see, for example, Patent Documents 1 and 2).

In this manner, a mechanism of controlling a beam direction is simplified while the overhead of beam scanning is kept minimum. At the same time, a target in the requested coverage can be detected within a short period of time. In addition, the combination of the wide-angle beam and the DBF method can be further combined with the radar principle such as the FMCW system, the dual-frequency CW system, and the multiple-frequency CW system. Further, the pulsation of the wide-angle transmitted beam solves most of the problems caused in providing a practical on-vehicle radar.

Patent Document 1: U.S. Pat. No. 5,497,161 A
Patent Document 2: JP 3622565 B2

DISCLOSURE OF THE INVENTION

Problems to be Solved by the Invention

However, because the wide-angle beam has a large beam width, there is a problem that an S/N ratio of a received signal is lowered. As a method of solving such a problem, a method of integrating the received signals obtained as echoes of the pulse in a time axis direction or over a plurality of pulses to ensure the S/N ratio is used in a pulse radar. Such a process is known as a signal integration process. In order to perform the integration process, however, it is necessary to collect signals to be integrated over a plurality of observation periods. Therefore, an observation value is not obtained unless the observation periods required for signal collection elapses. As a result, response performance is deteriorated.

Means for Solving the Problems

In order to solve the aforementioned problems, a target detecting method according to the present invention includes: a first signal integrating step of receiving an echo of a transmitted pulse in a first range cell after elapse of a first time from a pulse transmission to generate a signal based on the received echo and integrating a first number of signals of the generated signals to output the result of integration as a first range cell integrated signal; a second signal integrating step of receiving an echo of a transmitted pulse in a second range cell after elapse of a second time different from the first time from the pulse transmission to generate a signal based on the received echo and integrating a second number of signals of the generated signals, the second number being different from the first number, to output the result of integration as a second range cell integrated signal; and a target detecting step of detecting a target based on the first range cell integrated signal and the second range cell integrated signal.

The range cell corresponds to an interval in which an echo of a transmitted pulse is received, and serves as an observation period segmented at a predetermined time width. The range cell is also referred to as range gate or range bin.

When a radar transmits one transmission pulse, the transmission pulse is reflected by a plurality of reflection sources present in an observation coverage at different distances. In a case where echoes return back to the radar system, the respective echoes, which are reflected by the reflection sources present at different distances, have a variation in arrival time due to a difference between path lengths.

A receiving antenna of the radar converts the echoes having a variation in arrival time into a temporally continuous analog received signal. Then, the temporally continuous analog received signals are sampled at predetermined intervals to be converted into digital signals. The reflection sources present at difference distances are represented as digital signals indifferent sampling intervals. Each of the sampling intervals serves as a range cell. Specifically, a first range cell and a second range cell are both intervals for temporally dividing a temporally continuous single analog received signal.

Generally, as a propagation path of a radio wave becomes longer, the intensity or the S/N ratio of the radio wave at arrival point thereof deteriorates. Therefore, the intensity or the S/N ratio of the echo to be observed differs between the first range cell and the second range cell. If the S/N ratio deteriorates, a signal component of the echo coming back from a real target is buried in noise to be difficult to be detected.

EFFECT OF THE INVENTION

According to the present invention, as for an echo having a short radio wave propagation path and therefore having satisfactory intensity and S/N ratio, the number of observations for collecting the signals to be used for an integration operation is reduced, thereby shortening a response time to obtain the result of observations. On the other hand, as for an echo having a long radio wave propagation path and therefore having unsatisfactory intensity and S/N ratio, the number of observations used for the integration operation is increased to allow a satisfactory S/N ratio for obtaining the result of observations to be ensured.

Note that the present invention is not limited to a structure in which the number of observation times for obtaining the signals used for the integration process of the echo from a distant reflection source is made larger than that for obtaining the signals used for the integration process of the echo from a nearby reflection source. For example, when a reflection source having a high reflectance is known to be present in a certain range of the observation coverage through a prediction process or a tracking process performed based on the results of preceding observations, a structure, in which the number of observations is reduced for the range cell including an echo from the reflection source whereas the number of observations is increased for the range cells interposing the range cell including the echo, may be employed.

Figure 1:
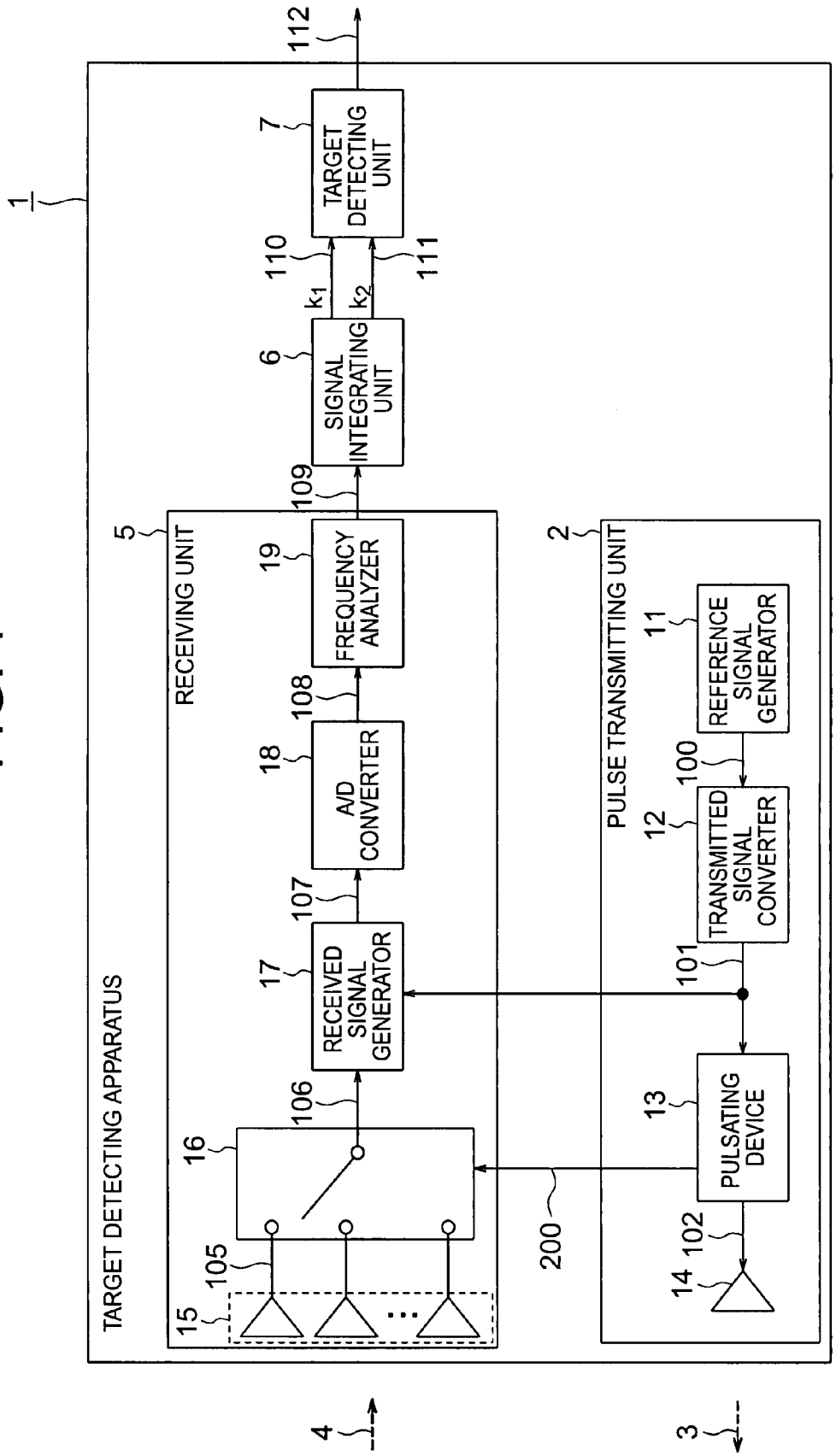
[FIG. 1] A block diagram of a target detecting apparatus according to a first embodiment of the present invention.

DESCRIPTION OF REFERENCE NUMERALS 2 pulse transmitting unit
3 transmitted pulse
4 echo
5 receiving unit
6 signal integrating unit
7 target detecting unit
11 reference signal generator
12 transmitted signal converter
13 pulsating device
14 transmitting antenna
15 array antenna
16 switching unit
17 received signal converter
18 a/d converter
19 frequency analyzer
100 reference signal
101 transmitted signal
102 pulse signal
107 differential signal
108 digital differential signal
109 frequency signals
110, 111 integrated signal
112 observed value of target

BEST MODE FOR CARRYING OUT THE INVENTION

First Embodiment

FIG. 1 is a block diagram illustrating a configuration of a target detecting apparatus according to a first embodiment of the present invention. A target detecting apparatus 1 illustrated in FIG. 1 observes a target by using an FMCW radar system, and includes a pulse transmitting unit 2, a receiving unit 5, a signal integrating unit 6, and a target detecting unit 7.

Figure 2:
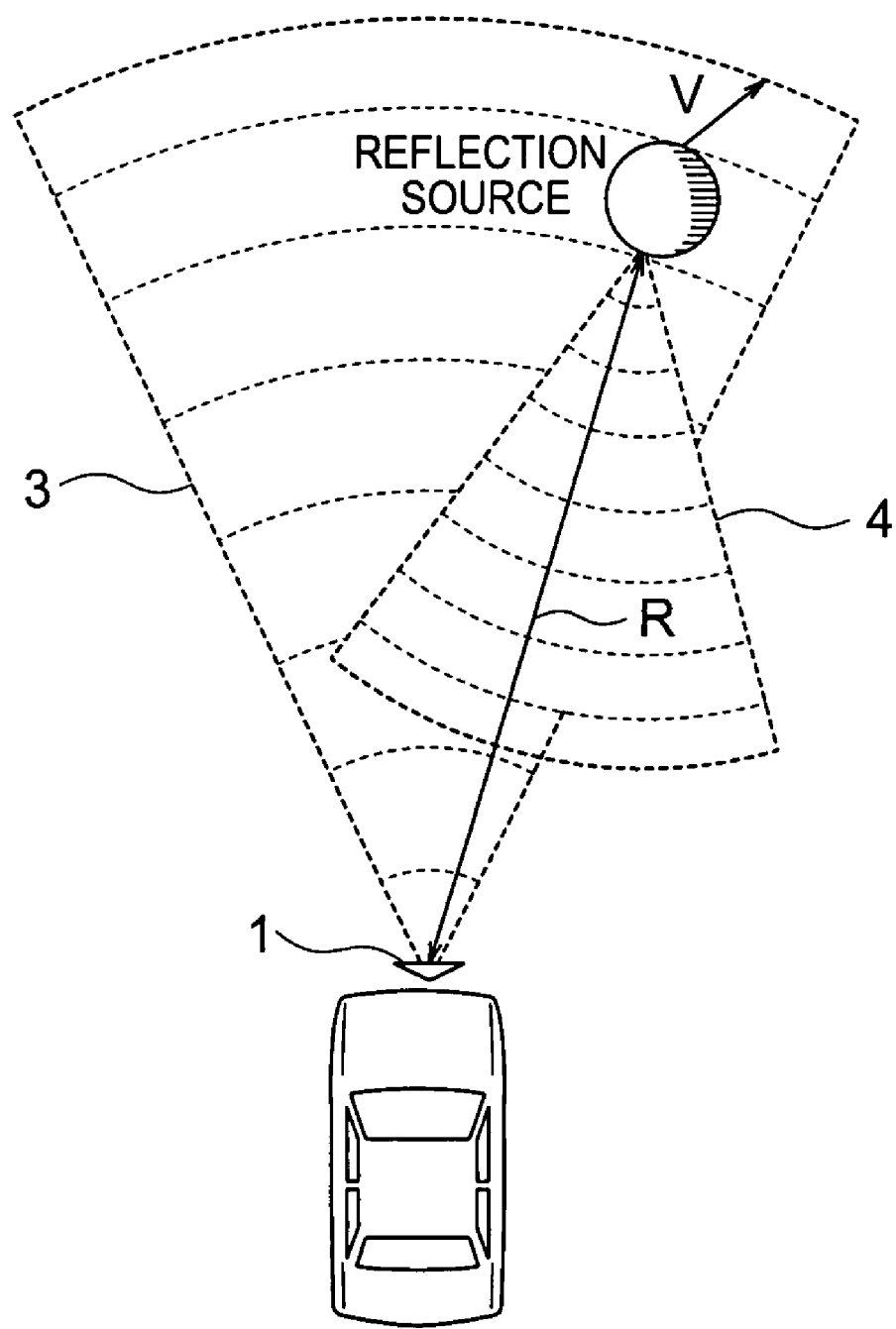
[FIG. 2] A diagram illustrating a relation between a transmitted pulse and an echo according to the first embodiment of the present invention.

The pulse transmitting unit 2 generates a transmitted signal which is subjected to frequency modulation and pulsates the generated transmitted signal to output a transmitted pulse 3. As illustrated in FIG. 2, a part of the transmitted pulse 3 is reflected by a reflection source present outside the target detecting apparatus 1 to return back to the target detecting apparatus 1 as an echo 4.

Assuming that a distance between the reflection source and the target detecting apparatus 1 is R and a velocity of the reflection source is V, the transmitted pulse 3 reaches as the echo 4 after having traveled forth and back through a path having the length R. Therefore, assuming that a light velocity is c, a time expressed by T=2R/c elapses between the transmission of the transmitted pulse 3 and the reception of the echo 4. When the transmitted pulse 3 is reflected back to generate the echo 4, frequency modulation according to the velocity V of the reflection source is performed. The receiving unit 5 detects the echo 4 to generate a signal based on the echo 4. The signal generated in the receiving unit 5 is ultimately output to the target detecting unit 7 where a target corresponding to the reflection source is detected based on an arrival time and a frequency of the echo 4.

The target detecting apparatus 1 is characterized in that the signal integrating unit 6 is provided between the target detecting unit 7 and the receiving unit 5. The signal integrating unit 6 is a section which improves an S/N ratio of the signal output from the receiving unit 5 to input a signal obtained as the result of improvement to the target detecting unit 7. The signal integrating unit 6 can enhance, for example, detection accuracy of a distant target from which an intense echo cannot be obtained because of the distance.

Subsequently, detailed configuration and operation of the target detecting apparatus 1 will be described referring to the drawings. As FIG. 1 illustrates, the pulse transmitting unit 2 includes a reference signal generator 11, a transmitted signal converter 12, a pulsating device 13, and a transmitting antenna 14.

The reference signal generator 11 in the pulse transmitting unit 2 generates a reference signal 100 having a frequency modulated in a predetermined cycle by a voltage controlled oscillator. The target detecting apparatus 1 employs the FMCW radar system. Therefore, the reference signal generator 11 performs frequency modulation including a frequency increasing process in which the frequency is increased and a frequency decreasing process in which the frequency is decreased on the reference signal 100, as the frequency modulating method for the reference signal 100.

Figure 3:
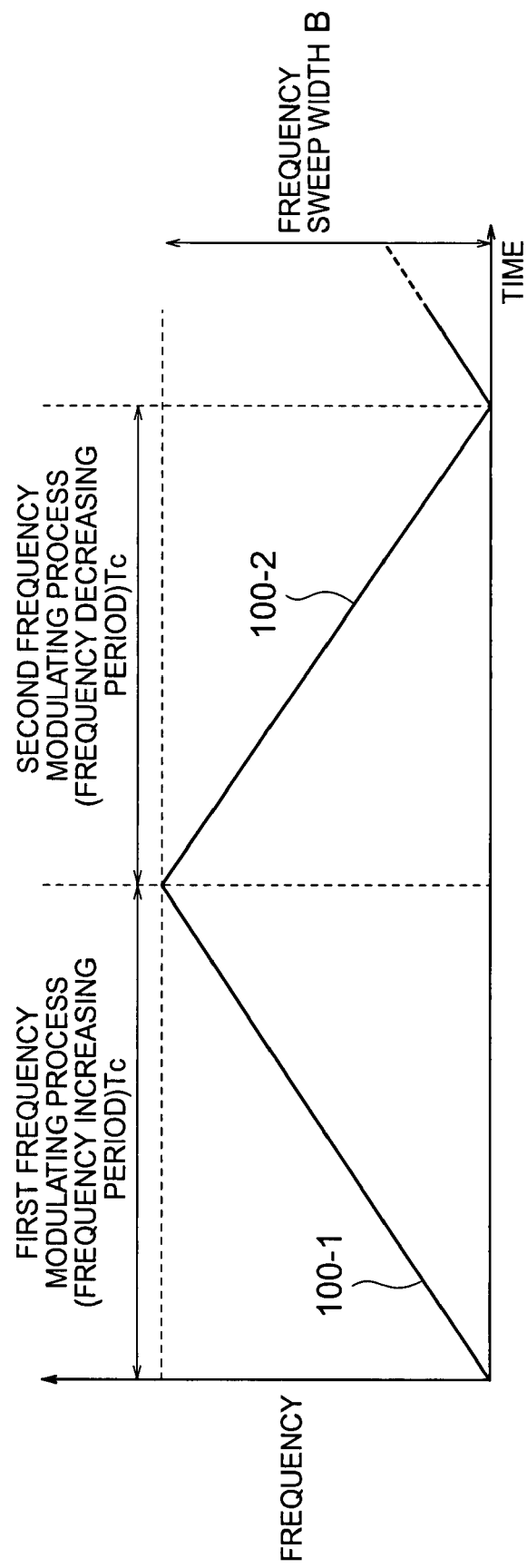
[FIG. 3] An explanatory diagram of a frequency modulating method according to the first embodiment of the present invention.

FIG. 3 illustrates a frequency variation of the reference signal 100 generated from the reference signal generator 11 with time. In the drawing, straight lines 100-1 and 100-2 represent transitions in frequency of the reference signal 100. The straight line 100-1 is for a first frequency modulation period (frequency increasing period) in which the frequency is linearly increased. The straight line 100-2 is for a second frequency modulation period (frequency decreasing period) in which the frequency is linearly decreased.

In this manner, the reference signal generator 11 sequentially repeats the first frequency modulation period and the second frequency modulation period to perform the frequency modulation. It is assumed that a length of each of the first and second frequency modulation periods is $T_c$, and a frequency sweep width (a difference between an upper limit and an lower limit of the frequency to be modulated) is B.

In the following description, each of the periods of the frequency increasing process and the frequency decreasing process in the reference signal generator 11 is referred to as frequency change period.

The transmitted signal converter 12 converts the frequency of the reference signal 100 to obtain a transmitted signal 101 in a radio frequency (RF) band. Furthermore, the pulsating device 13 pulsates the transmitted signal 101 at pulse transmission intervals $T_{PRI}$ to generate pulse signals 102 and output the obtained pulse signals to the transmitting antenna 14.

Figure 4:
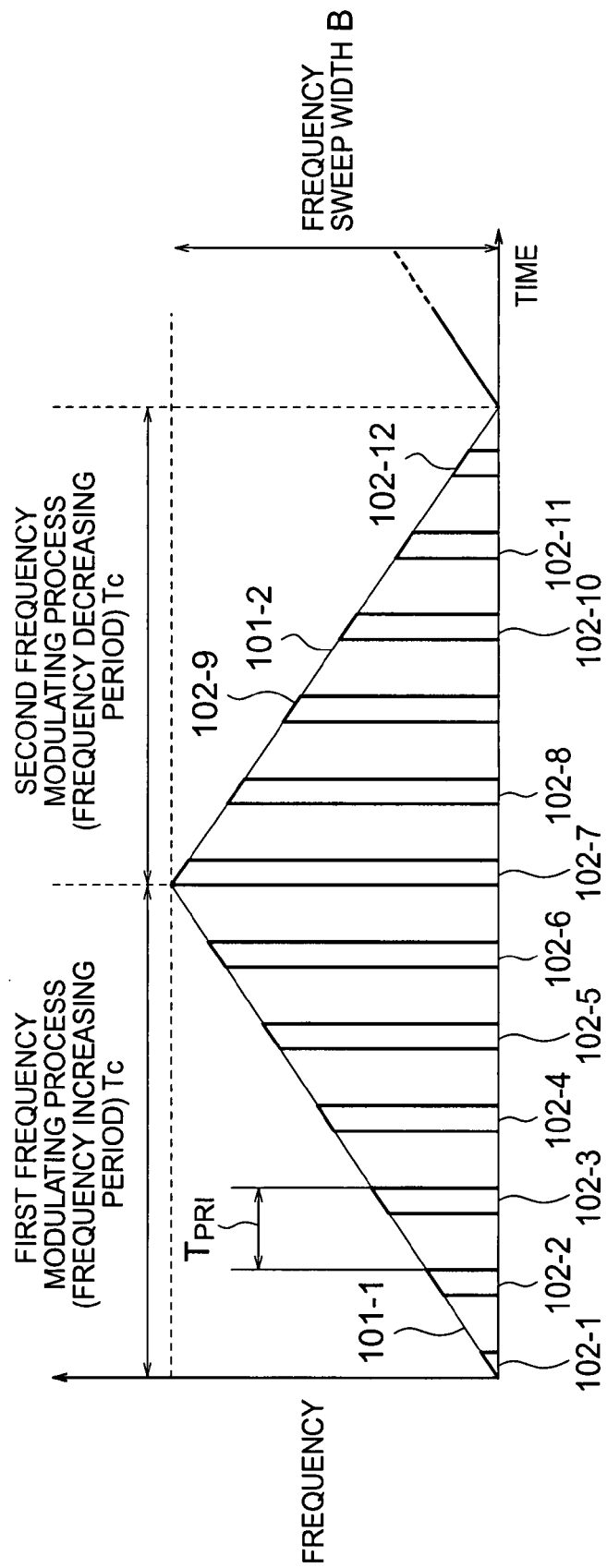
[FIG. 4] A diagram for illustrating a pulsation method according to the first embodiment of the present invention.

The relation between the pulse signals 102 and the transmitted signal 101 is as illustrated in FIG. 4. In FIG. 4, straight lines denoted by the reference numerals 101-1 and 101-2 represent transitions in frequency of the transmitted signal 101. Trapezoids 102-1 to 102-11 in thick lines correspond to the pulse signals 102 obtained by pulsating the transmitted signal 101. In this manner, a part of the transmitted signal 101 which is a continuous signal is pulsated and changed into the pulse signal 102. It should be noted that the transmitted signal 101 is a signal in the RF band and its baseband (lowest frequency) differs from that of the reference signal 100 illustrated in FIG. 3.

The time interval for outputting the pulse signal 102 is also referred to as pulse repetition interval and sometimes abbreviated as PRI. At the same time, the pulsating device 13 outputs a switching signal 200 in synchronous with the PRI. The switching signal 200 is used for reception switching in the subsequent process.

The transmitting antenna 14 externally emits the pulse signal 102 output from the pulse transmitting unit 2 as a transmitted pulse 3 of the wide-angle beam. As a result, the entire observation requested coverage of the target detecting apparatus 1 is illuminated with a single pulse transmission.

The receiving unit 5 is a section which detects and receives the echo 4 of the transmitted pulse 3 and generates and outputs a signal based on the received echo 4, and includes an array antenna 15, a switching unit 16, a received signal converter 17, an A/D converter 18, and a frequency analyzer 19.

The array antenna 15 includes N (N>1) element antennas at element intervals d. Each of the element antennas constituting the array antenna 15 receives the echo 4 at its own position to output an analog received signal 105 based on the received echo 4. In the following description, each of the element antennas constituting the array antenna 15 is denoted by an element number n ranging from 0 to N−1.

Figure 5:
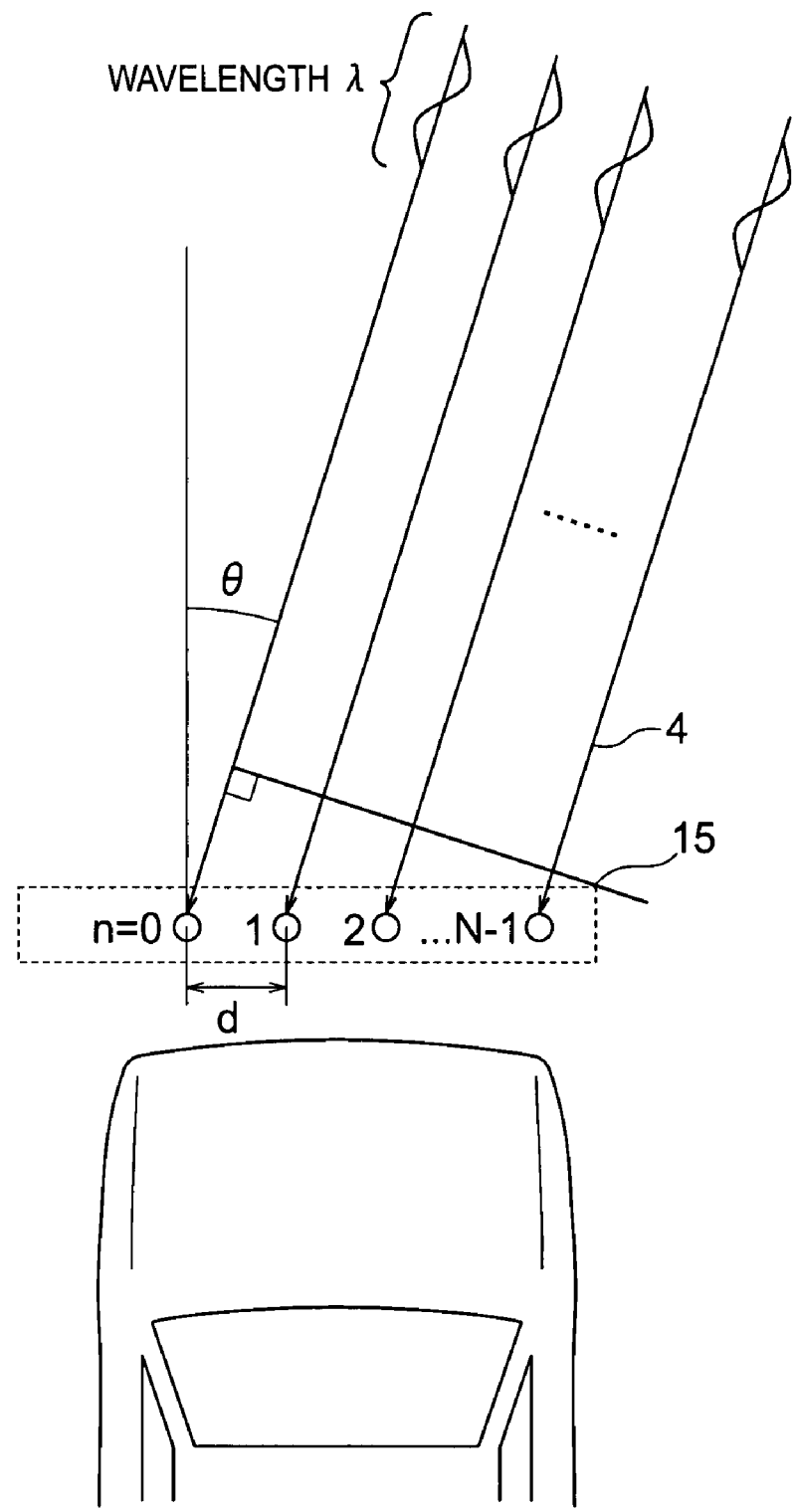
[FIG. 5] A diagram for illustrating a configuration of an array antenna according to the first embodiment of the present invention.

Assuming that a wavelength of the echo 4 is $\lambda$ and an incident angle of the echo 4 to an aperture of the array antenna 15 is $\theta$ when the array antenna 15 as described above is provided, a phase difference $\phi$ given by Formula (1) is generated between the adjacent element antennas as illustrated in FIG. 5.

[Expression 1]

$$\phi = 2\pi \frac{d}{\lambda} \sin(\theta) \quad (1)$$

Thus, the detection of the phase difference φ between the received signals of the respective element antennas allows the estimation of the incident angle θ of the echo 4, that is, the direction of the reflection source by using Formula (1).

Figure 6:
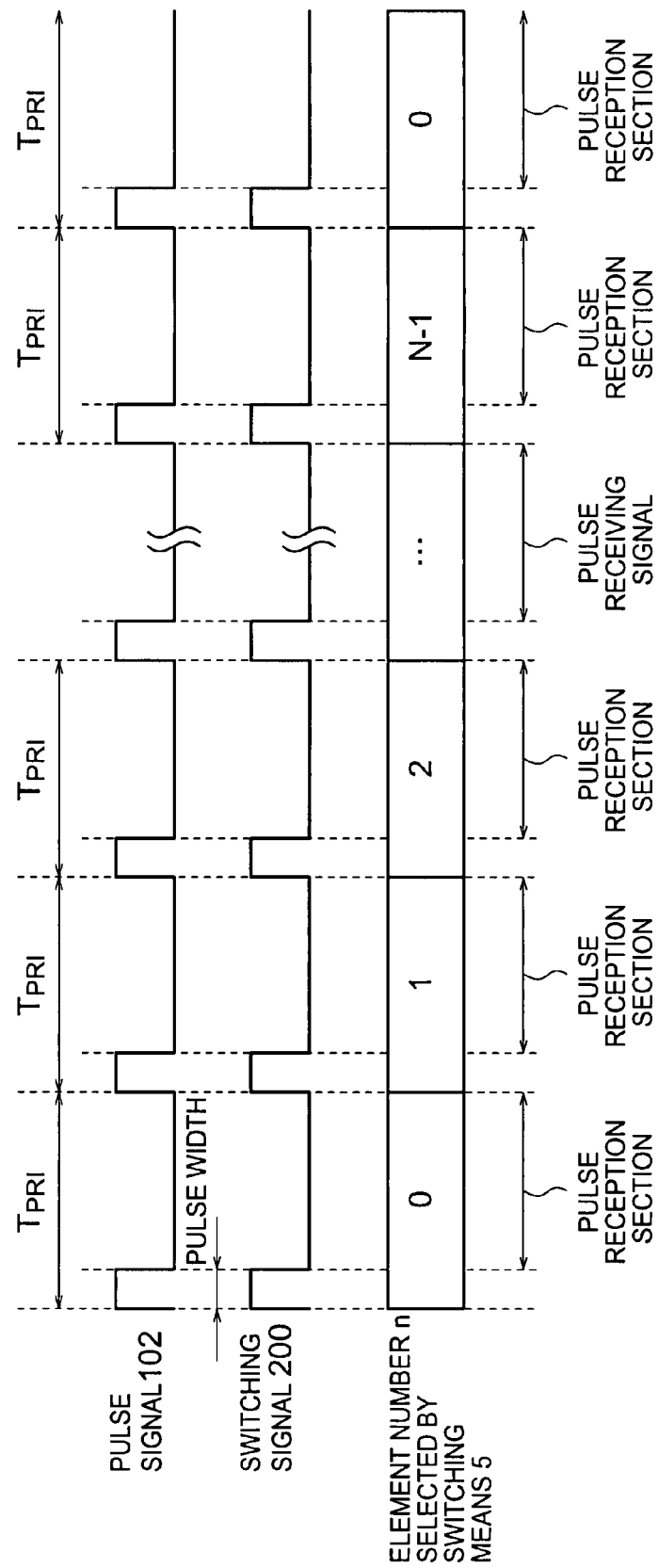
[FIG. 6] A timing chart of element switching according to the first embodiment of the present invention.

The switching unit 16 includes input terminals equal in number to the N element antennas of the array antenna 15. Each of the input terminals is connected to any of the element antennas 0 to N−1 included in the array antenna. The switching unit includes one output terminal and alternatively switches the input terminal to be connected to the output terminal for each input of the switching signal 200 from the pulsating device 13 to output the received signal 105 from any of the input terminals as a received signal 106 in accordance with a timing chart as shown in FIG. 6.

As a result, for example, when the switching unit 16 currently outputs the received signal 105 from the element antenna n (n=0 to N−1) as the received signal 106, upon input of the new switching signal 200 to the switching unit 16, the received signal 105 from the element antenna n+1 is output as the received signal 106. However, the number of element antennas is N. Therefore, upon input of the new switching signal 200 to the switching unit 16 when n is equal to N−1, the received signal 105 from the element antenna 0 is output as the received signal 106.

As a result of such a configuration, it is possible to realize the structure including the sections including the received signal converter 17, the A/D converter 18 and the frequency analyzers 19 in the receiving unit 5, and further including only one digital signal processing system such as the signal integrating unit 6 and the target detecting unit 7, which allows the circuits to be used in time division. The structure for performing signal processing on the received signal from the array antenna including a plurality of element antennas in time division is disclosed in the documents including, for example, U.S. Pat. No. 5,497,161, "Angle Of Arrival (AOA) Solution Using A Single Receiver", and U.S. Pat. No. 3,916,407, "Doppler Navigation System With Angle And Radial Velocity", and is a well-known technique in this field of art. Therefore, the description of the detailed operation principle thereof is herein omitted.

In the following description, a period from the time at which the switching unit 16 connects to the element antenna 0 to the time at which the switching unit 16 connects to the element antenna 0 again after having successively connected to the antennas 1, 2, through N−1 is referred to as scanning period. The number of scanning periods after the start of the frequency modulation process in any of the frequency increasing period and the frequency decreasing period is indicated by a variable m (m is an integer equal to or larger than 0).

The received signal converter 17 mixes the transmitted signal 101 output from the transmitted signal converter 12 and the analog received signal 106 to generate and output a differential signal 107 between the two. Since the target detecting apparatus 1 employs the FMCW system, the differential signal is also referred to as beat signal. In this manner, as a result, the analog received signal 106 in the RF band is down-converted into the differential signal 107 in a video signal band.

Thereafter, the A/D converter 18 samples the differential signal 107 for each sampling interval having a predetermined time width to output digital differential signals 108. Herein, the sampling interval in the A/D converter 18 after the pulse transmission is treated as a range cell. The number k of samplings performed after the pulse transmission before the start of the range cell is referred to as range cell number. The range cell number of the first range cell is 0 because no sampling has been performed before.

Figure 7:
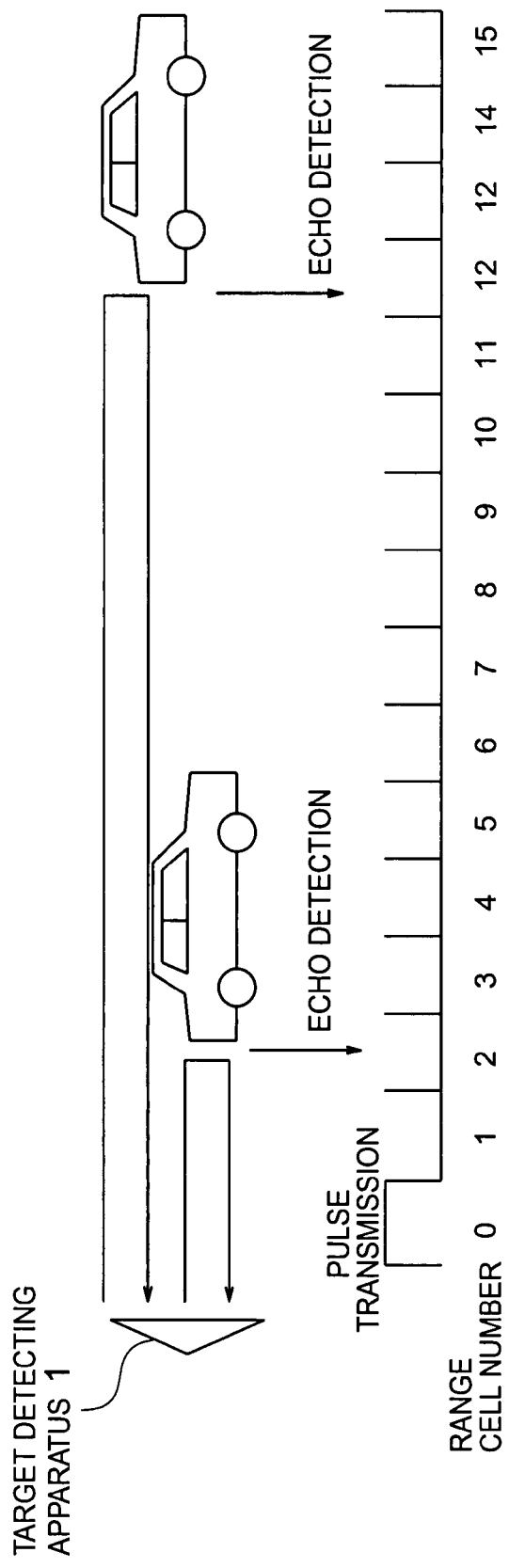
[FIG. 7] An explanatory diagram of range cells according to the first embodiment of the present invention.
Figure 8:
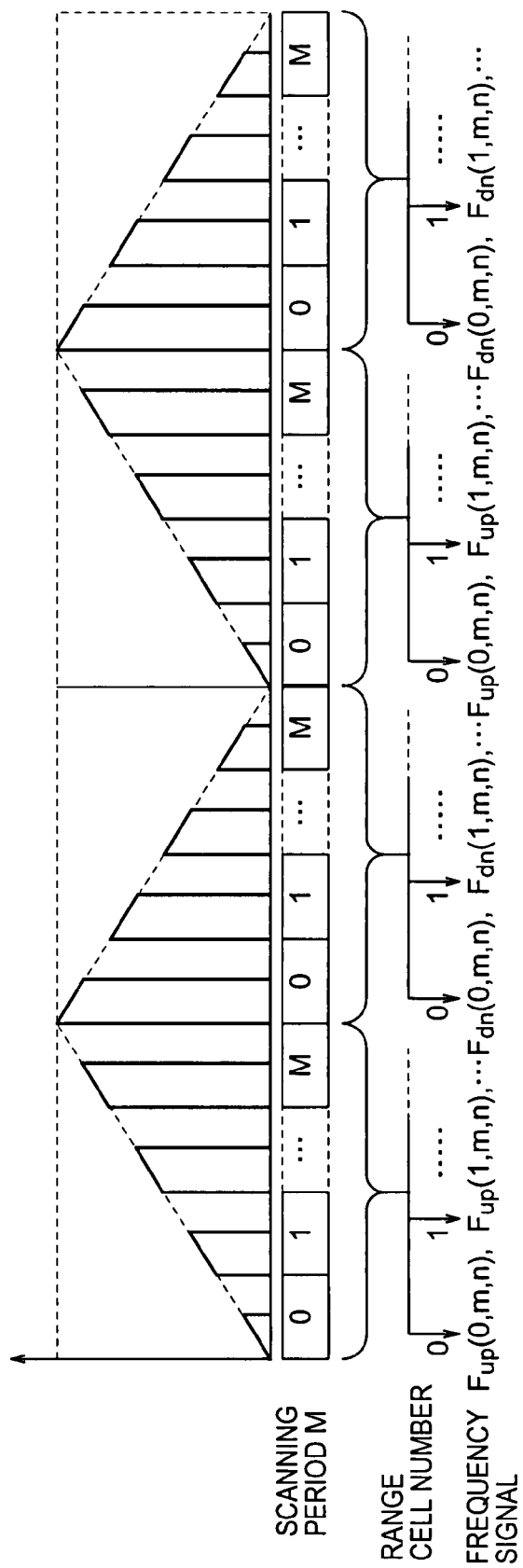
[FIG. 8] An explanatory diagram of a frequency analysis process according to the first embodiment of the present invention.

Since the target detecting apparatus 1 adopts the system of transmitting the transmitted pulse 3 of the wide-angle beam to receive its echo 4, the entire coverage is irradiated with a single transmitted pulse. However, since a plurality of reflection sources can be present at different distances in the coverage, echoes from the reflection sources at different distances from the target detecting unit 1 are detected in different range cells, even if the irradiation of the transmitted pulse 3 is performed only one time, as shown in FIG. 7.

In the case of the pulse system radar, in principle, a distance to the reflection source can be obtained based only on the range cell number of the echo of each pulse (elapsed time from the pulse transmitting). Moreover, the velocity of the reflection source can be calculated from the relation between the frequency of the echo and the frequency of the transmitted pulse. In the pulse radar, however, a process of detecting the target is required to be completed in the transmitting/receiving process of each pulse. Therefore, the pulse transmitting/receiving process and the signal processing have to be executed at almost the same computing speed. Accordingly, a signal processing circuit operating at an extremely high speed is required. Moreover, with the reduction in pulse width or sampling cycle, a computation load of the signal processing is increased.

However, since the target detecting apparatus 1 according to the first embodiment of the present invention uses the transmitted pulse 3 obtained by pulsating the continuous reference signal 100 which is subjected to frequency modulation as illustrated in FIG. 3, the principle of a CW system can be employed in place of that of the pulse system. Specifically, instead of performing all the signal processing in each pulse transmission/reception, the reflection source is detected based on the relation between the frequency modulation of the transmitted wave and the frequency of the received echo. As a result, the computation load of the signal processing is reduced to allow the reduction of size and cost of the circuit.

Therefore, hereinafter, the target is detected through the signal processing according to the FMCW system. First, in the given scanning period m, the differential signal 108 in the frequency increasing period in the range cell with the range cell number k and the element antenna number n selected by the switching unit 16 are expressed by Formula (2) for the reflection source (assuming a direction is θ) illustrated in FIG. 2. The differential signal 108 in the frequency decreasing period is expressed by Formula (3).

[Expression 2]

$$X_{up}(k, m, n) = \exp\left\{2\pi j\left(f_{up}T_s m + \left(f_{up}T_{PRI} + \frac{d}{\lambda}\sin(\theta)\right)n + \varphi_{up}(k)\right)\right\} \quad (2)$$

$$\text{where } f_{up} = -\frac{2B}{cT_c}R - \frac{2}{\lambda}V$$

-continued $$X_{dn}(k, m, n) = \exp\left\{2\pi j\left(f_{dn}T_s m + \left(f_{dn}T_{PRI} + \frac{d}{\lambda}\sin(\theta)\right)n + \varphi_{dn}(k)\right)\right\} \quad (3)$$

$$\text{where } f_{dn} = \frac{2b}{cT_c}R - \frac{2}{\lambda}V$$

In Formulae (2) and (3), $T_S$ is a value given as $T_S=T_{PRI}\times N$, specifically, a length of the scanning period. The sign of the beat frequency differs depending on the mixing method or the determination of the sign of a velocity. However, there is no essential difference. $\varphi_{up}(k)$ and $\varphi_{dn}(k)$ are constant phase terms depending on a time delay.

In Formulae (2) and (3), the frequency for a variable n is expressed by the sum of the beat frequency for a variable m and the frequency according to the incident direction. When the number of targets is plural, the frequency is expressed as a linear sum for each target.

The frequency analyzer 19 analyzes the frequencies of the digital differential signals 108 obtained from the echo 4, which are expressed by Formulae (2) and (3), as signals based on the echo 4 of the transmitted pulse 3, and outputs frequency signals 109 corresponding to the results of analysis. For the generation of the frequency signals, a Fourier transform is performed on the digital differential signals 108 obtained in the range cell with the range cell number k, which are obtained from the element antenna with the element number n in the M (M>1) scanning periods.

[Expression 3]

$$F_{up}(k, m_f, n) = \sum_{m=0}^{M-1} X_{up}(k, m, n)\exp\left[-j\left\{2\pi\left(\left(\frac{m_f}{M}\right)m\right)\right\}\right] \quad (4)$$

$$F_{dn}(k, m_f, n) = \sum_{m=0}^{M-1} X_{dn}(k, m, n)\exp\left[-j\left\{2\pi\left(\left(\frac{m_f}{M}\right)m\right)\right\}\right] \quad (5)$$

As is apparent from Formulae (4) and (5), the frequency signal is obtained by using a plurality of the differential signals $X_{up}$ (k, m, n) in the frequency increasing period or a plurality of the differential signals $X_{dn}$ (k, m, n) in the frequency decreasing period. Specifically, the frequency signal is a signal based on the echo received over a plurality of pulse reception intervals. If the target can be detected by using the frequency signal extracted from a plurality of pulse reception intervals in this manner, the signal processing at a high speed compatible with the speed of the pulse transmission/reception is no longer required to be performed.

However, because each of Formulae (4) and (5) expresses a calculation for multiplying each differential signal $X_{up}$ (k, m, n) or $X_{dn}$ (k, m, n) by a predetermined multiplier $\exp[-j\{2\pi(m_f/M)m\}]$ and then adding the differential signals. Therefore, when the S/N ratio of the echo in the range cell is not large enough, the frequency signal contains a large amount of frequency signals of the echo (noise) other than that from the reflection source.

Thus, the frequency analyzer 19 detects an output frequency number at which an amplitude value is equal to or larger than a predetermined value in the frequency signal $F_{up}$ (k, $m_f$ n) or $F_{dn}$ (k, $m_f$ n). This process is also known as a process of detecting a frequency number providing a frequency peak. As a result of the process, it is assumed that a frequency number $m_p$ is detected in the frequency increasing period, whereas a frequency number $m_q$ is detected in the frequency decreasing period. As a result, the frequency analyzer 19 outputs the frequency signal 109 expressed by Formula (5) for each range cell in the frequency increasing period. In the frequency decreasing period, the frequency signal 109 expressed by Formula (6) is output for each range cell.

[Expression 4]

$$F_{up}(k, m_p, n) = \exp\left\{2\pi j\left(\left(\frac{d}{\lambda}\sin(\theta)\right)n + \varphi_{up}(k)\right)\right\} \quad (6)$$

$$F_{dn}(k, m_q, n) = \exp\left\{2\pi j\left(\left(\frac{d}{\lambda}\sin(\theta)\right)n + \varphi_{dn}(k)\right)\right\} \quad (7)$$

The frequency signal 109 expressed by Formula (6) or (7) contains a large amount of frequency signals due to noise. In particular, in the first range cell with a small S/N ratio (for example, range cell with a long delay time), it is difficult to distinguish between noise and a true reflection source from each other.

Therefore, for the frequency signal $F_{up}$ ($k_1$, $m_p$, n) with the range cell number $k_1$, the signal integrating unit 6 collects $F_{up}$ ($k_1$, $m_p$, n) in $SW_1$ observation periods where each scanning period corresponds to one observation period. Then, after an integration operation as expressed by Formula (8) is performed to obtain a first integrated signal $SF_{up}$, the obtained signal is output as an integrated signal 110. For the frequency signal $F_{up}$ ($k_2$, $m_p$, n) with the range cell number $k_2$, the signal integrating unit 6 collects $F_{up}$ ($k_2$, $m_p$, n) in $SW_s$ observation periods. Then, after an integration operation as expressed by Formula (9) is performed to obtain a second integrated signal $SF_{up}$, the obtained signal is output as an integrated signal 111. Herein, $k_1 \neq k_2$ is established, and $SW_1$ and $SW_2$ are natural numbers satisfying: $SW_1 \neq SW_2$.

[Expression 5]

$$SF_{up}(k_1, m_p, n) = \sum_{i=0}^{SW_1-1} F_{up}(k_1, m_p, n)_i \frac{F_{up}(k_1, m_p, 0)_i^*}{|F_{up}(k_1, m_p, 0)_i|} \quad (8)$$

$$SF_{up}(k_2, m_p, n) = \sum_{i=0}^{SW_2-1} F_{up}(k_2, m_p, n)_i \frac{F_{up}(k_2, m_p, 0)_i^*}{|F_{up}(k_2, m_p, 0)_i|} \quad (9)$$

In Formulae, i is an identification number for identifying each of the $SW_1$ frequency signals collected to be used for the integration process, and * represents a complex conjugate.

Generally, frequency signals due to noise are less likely to be detected in the same range cell over a plurality of scanning periods. Therefore, the integration of the frequency signals 109 in the range cell with the same range cell number over a plurality of scanning periods relatively reduces the effects of the frequency signal due to noise. On the other hand, the frequency signals obtained from the echo of the true reflection source are observed substantially in the same range cell over a plurality of scanning periods. Therefore, when the frequency signals in the same range cell are integrated over a plurality of scanning periods, only the integrated value of the frequency signals obtained from the echo of the true reflection source increases to improve the S/N ratio. As a result, the accuracy of the range cell for detecting the reflection source, which is likely to be buried in noise because of an unsatisfactory S/N ratio, is improved.

In view of the above fact, as a method of selecting values for $SW_1$ and $SW_2$, when the S/N ratio of the range cell with the range cell number $k_1$ is smaller as the result of comparison between the S/N ratio of the range cell with the range cell number $k_1$ and that of the range cell with the range cell number $k_2$, a method of setting: $SW_1 > SW_2$ is conceived.

The integrated signal 110 is obtained by integrating the frequency signals collected from the $SW_1$ observation periods, whereas the integrated signal 111 is obtained by integrating the frequency signals collected from the $SW_2$ observation periods. Accordingly, the number of observation periods required for calculating by the integrated signal 110 differs from that required for calculating by the integrated signal 111. Therefore, the signal integrating unit 6 outputs the integrated signal 110 once in the $SW_1$ observation periods for the range cell number $k_1$. On the other hand, the signal integrating unit 6 outputs the integrated signal 111 once in the $SW_2$ observation periods for the range cell number $k_2$.

As a result, when $SW_1 > SW_2$ is established, the response performance of the integrated signal 111 in the range cell with the range cell number $k_2$ is $SW_1/SW_2$ times as many as that of the integrated signal 110 in the range cell with the range cell number $k_1$, thereby obtaining good response performance. On the other hand, even when the S/N ratio of the frequency signal in the range cell with the range cell number $k_1$ is only $SW_2/SW_1$ as many as times that of the frequency signal in the range cell with the range cell number $k_2$, the response performance is improved by the integrating process expressed by Formula (8) to the same level as that of the range cell with the range cell number $k_2$. Thus, target detection performance is enhanced.

Thereafter, the target detecting unit 7 calculates movement characteristics of the reflection source of the echo based on the integrated signals 110 and 111. For example, a Fourier transform as expressed by Formula (10) is performed on the integrated signal 110 to perform a beam forming process.

[Expression 6]

$$B_{up}(k_1, m_p, n_a) = \sum_{n=0}^{N-1} SF_{up}(k_1, m_p, n)\exp\left\{-2\pi j\left(\left(\frac{n_a}{N}\right)n\right)\right\}$$ (10)

where a beam direction $\phi_{na}$ generally has a relation expressed by:

[Expression 7]

$$\frac{n_a}{N} = \frac{d}{\lambda}\sin(\phi_{na})$$ (11)

Next, the target detecting unit 7 performs a threshold process for amplitudes of multi-beam forming signals $B_{up}(k,m_p,n)$ and $B_{dn}(k,m_q,n)$ for the respective detected frequency signals to obtain the beam direction $\phi_{na}$ equal to or larger than a predetermined level. In this case, when the number of beam directions which exceed the threshold value is one or more, it is determined that the detected frequency signal is a final detection.

As the final process, the target detecting unit 7 detects detected frequency numbers $m_p$ and $m_q$ from which the same beam direction $\phi_{na}$ is detected, as candidates for pairing, in the frequency increasing period and the frequency decreasing period based on the principle of the FMCW radar. Then, from Formulae (11) and (12), the distance R to the target and the relative velocity V of the target are obtained.

[Expression 8]

$$f_{up} = \left(-\frac{2B}{cT}R - \frac{2}{\lambda}V\right)$$ (12)

$$= \frac{m_p}{M}T_s$$

$$f_{dn} = \left(\frac{2B}{cT}R - \frac{2}{\lambda}V\right)$$ (13)

$$= \frac{m_q}{M}T_s$$

The pairing process may use an evaluation criterion as expressed by:

[Expression 9]

$$\min_{m_p,m_q} = \left\{\sum_{n=0}^{N-1} |B_{up}(k_1, m_p, n) - B_{dn}(k_1, m_q, n)|\right\}$$ (14)

As described above, the number of signals based on the echo in the range cell, which are to be collected and integrated, is varied according to the S/N ratio of the range cell, so the range cell having a small S/N ratio can satisfactorily improve the S/N ratio to enhance the detection accuracy of the target. On the other hand, the range cell, which has a satisfactorily large S/N ratio and therefore is not required to perform the integration process with so many signals, can focus on the response performance to calculate the observation value at a high speed.

As a result, the radar which can deal with a broad coverage from distant to close ranges can be realized by only one processing circuit without increasing the transmission power.

In this first embodiment, supposing that the radar is realized by a low-speed signal processing circuit, the frequency signal is obtained from the echo in the CW system radar to improve the S/N ratio of the frequency signal. However, it is apparent that the same structure can be easily applied to the pulse system radar by varying the number of signals to be collected for the process of integrating the S/N ratios of the echoes in different range cells.

Second Embodiment

In the target detecting apparatus according to the first embodiment, the integration method based on Formula (8) is employed in the signal integrating unit 6. Besides, it is also possible to employ the structure, in which the multi-beam forming process as expressed by Formula (15) is performed on the frequency signals 109 expressed by Formulae (6) and (7) and the integration process is implemented on the result of multi-beam forming process.

[Expression 10]

$$B_{up}(k_1, m_p, n_a) = \sum_{n=0}^{N-1} SF_{up}(k, m_p, n)\exp\left\{-2\pi j\left(\left(\frac{n_a}{N}\right)n\right)\right\}$$ (15)

Subsequently, the integration process as expressed by Formula (16) is performed by using the result of multi-beam formation over SW scanning periods to control the S/N ratio.

[Expression 11]

$$SB_{up}(k, m_p, n_a) = \sum_{i=0}^{SW-1} |B_{up}(k, m_p, n_a)_i| \quad (16)$$

In short, there are various specific methods of controlling the S/N ratio. However, the feature of the present invention lies in gain control using the frequency signals over a different number of scanning periods according to the range cell number or the delay time. Therefore, the gain control method is not particularly limited to a specific one.

INDUSTRIAL APPLICABILITY

The present invention can be widely applicable to the field in which a pulse wave is transmitted to calculate movement characteristics of an object or a propagation wave reflection source present in the distance, and, in particular, is suitable as a technique for an on-vehicle radar.

The invention claimed is:

1. A target detecting apparatus, comprising:
receiving means of receiving an echo of a transmitted pulse in a first range cell after elapse of a first time from a pulse transmission to output a first signal based on the received echo and receiving an echo of a transmitted pulse in a second range cell after elapse of a second time from the pulse transmission, the second time being different from the first time, to output a second signal based on the received echo;
signal integrating means of integrating a first number of the first signals output from the receiving means to output the result of integration as a first range cell integrated signal and integrating a second number of the second signals, the second number being different from the first number, to output the result of integration as a second range cell integrated signal, wherein the signal integrating means sets the second number larger than the first number when the second time elapses after the first time;
target detecting means of detecting a target based on the first range cell integrated signal and the second range cell integrated signal; and
pulse transmission means of transmitting a pulse of a wide-angle beam, wherein the receiving means includes an array antenna including a plurality of element antennas to cause the element antennas of the array antenna to receive the echoes of the transmitted pulse in the first range cell and the second range cell over a plurality of pulse reception intervals.

2. A target detecting apparatus according to claim 1, wherein the target detecting means uses the first range cell integrated signal to perform multi-beam formation and uses a beam signal formed by the multi-beam formation to detect a reflection source of the echo received in the first range cell as a target while using the second range cell integrated signal to perform the multi-beam formation and using a beam signal formed by the multi-beam formation to detect a reflection source of the echo received in the second range cell as a target.

3. A target detecting apparatus according to claim 2, wherein:
the receiving means analyses a frequency of a received signal of the echo in the first range cell to output a first frequency signal and analyses a frequency of a received signal of the echo in the second range cell to output a second frequency signal; and
the signal integrating means integrates a first number of the frequency signals output from the receiving means to output the result of integration as a first range cell integrated signal and integrates a second number of the frequency signals output from the receiving means to output the result of integration as a second range cell integrated signal.

4. A target detecting apparatus according to claim 3, wherein the pulse transmitting means pulsates a continuous wave with predetermined frequency modulation and transmits the obtained pulse signal as a pulse of a wide-angle beam.

* * * * *